March 30, 1937. V. I. WHITMAN 2,075,684
EXCISED PHOTOGRAPHIC PLATE SYSTEM OF
COMPOSITE MOTION PICTURE PHOTOGRAPHY
Filed May 3, 1935  2 Sheets-Sheet 1
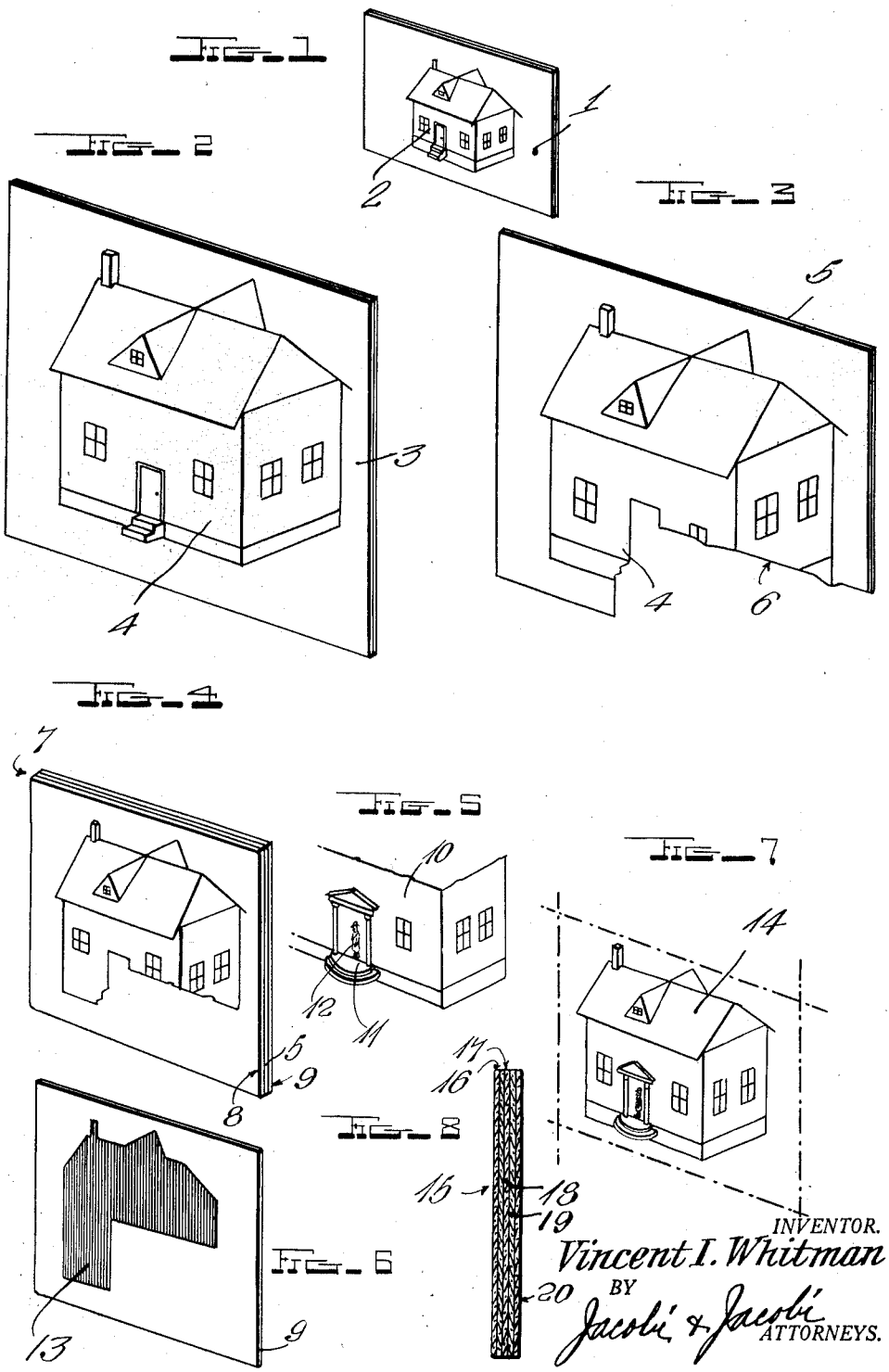
INVENTOR.
Vincent I. Whitman
BY
Jacobi & Jacobi
ATTORNEYS.

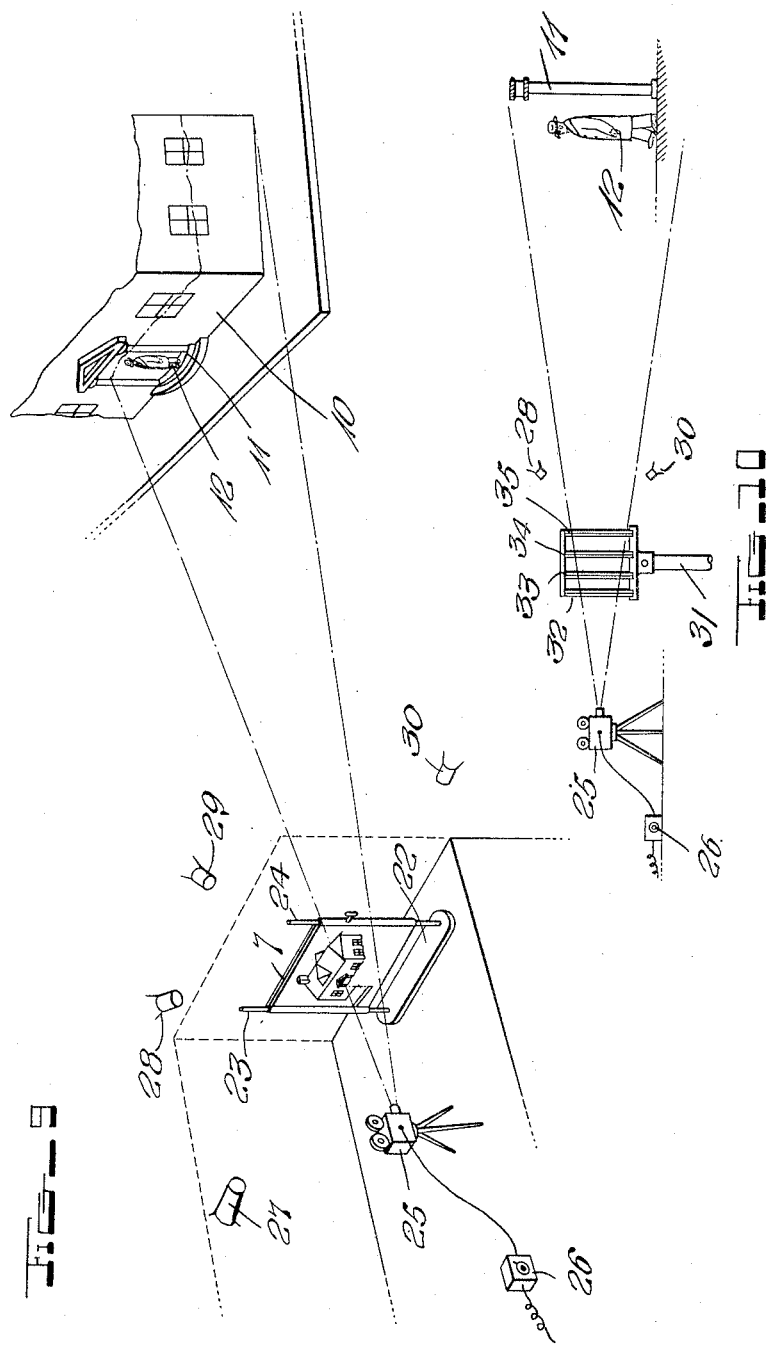

Patented Mar. 30, 1937

2,075,684

UNITED STATES PATENT OFFICE 2,075,684

EXCISED PHOTOGRAPHIC PLATE SYSTEM OF COMPOSITE MOTION-PICTURE PHOTOGRAPHY

Vincent I. Whitman, New York, N. Y.

Application May 3, 1935, Serial No. 19,706

10 Claims. (Cl. 88—16)

My invention relates to a composite system of photography, particularly motion picture photography, wherein a portion of a still background scene pictorially recorded is photographed in superimposed relation on the visual actions which occur in the foreground.

An object of my invention is to provide a system of motion picture photography in which a desired portion of a background scene not conveniently accessible may be recorded or represented without sending the actors to such inaccessible point, and the construction of the set required at the place where the actors perform their visual actions can be reduced to a small portion of the field of view, and the expense thereby reduced.

A further object of my invention is to provide a composite system of motion picture photography wherein a plurality of different background scenes occupying a portion of the field of view may be superposed on each other and on the visual actions of the actors.

A still further object of my invention is to provide a composite system wherein a background scene is photographically recorded as a positive, in colors if desired, on a translucent medium of comparatively small size, a portion of which translucent medium is exposed directly in front of the lens of the recording camera.

With these and numerous other objects in view, my invention consists in the novel features of construction, combination and arrangement of parts as will be hereinafter referred to and more particularly pointed out in the specification and claims.

In the accompanying drawings forming a part of this application:

Figure 1 shows a representation of a still background scene occupying the entire field of view;

Figure 2 shows a positive print or representation of the scene of Figure 1 on a sensitized celluloid sheet or other translucent medium, and suitably enlarged;

Figure 3 shows the positive print or representation of Figure 2 on the celluloid sheet or other medium, with a portion of the sheet cut out;

Figure 4 shows the cut-out celluloid sheet of Figure 3 mounted between two plain glass plates to prevent buckling or shifting;

Figure 5 shows an actual set which occupies a portion of the field of view corresponding to the cut-out portion of the celluloid sheet of Figure 3, and which is complementary to the scene represented by the retained portion of the celluloid sheet shown in Figure 3;

Figure 6 shows the plain glass supporting plate with the outline of the house of the celluloid sheet of Figures 3 and 4 frosted to diffuse light;

Figure 7 shows a composite picture as taken with the camera, superimposing the partial background scene of Figure 3, and the set and visual actions of Figure 5;

Figure 8 shows a plurality of positive prints on celluloid sheets mounted superimposed as in Figure 4 to superimpose a plurality of background views;

Figure 9 shows the assembled arrangement for photographing the cut-out celluloid plate of Figure 4 in connection with the actual set of Figure 5; and Figure 10 shows the assembled arrangement for photographing a multiple celluloid plate unit in connection with the actual set of Figure 5.

My system makes it possible for instance to record in the studio a picture having as a background a large building such as the United States Capitol, or some familiar scene of nature such as Niagara Falls, while having the actors perform right in the studio without it being necessary to send the entire motion picture cast to a distant location to employ some particular still background, such as Washington or Niagara Falls.

Referring to the figures in detail, Figure 1 shows an ordinary photograph or representation on a sensitized glass plate or a sensitized celluloid sheet 1, of some desired still background scene occupying the entire field of view, here shown as a house 2. Figure 2 shows a positive print or representation of the photograph or representation of Figure 1, which is made on a sensitized celluloid sheet 3, or other suitable translucent medium. This print on the celluloid sheet can be in colors if desired, or the print itself can be tinted after printing. In printing the positive on the celluloid sheet, the picture will be enlarged or reduced as required. This print transmits light like a photographic transparency, that is, it is light-transmitting of an order of magnitude intermediate complete transparency and complete opaqueness.

The portion of the celluloid sheet representing the portion of the field of view occupied by the physical set employed in the studio or location is then cut out as shown at 6 in Figure 3. The cut must be made along lines of the picture such that the view of the actual set will easily fit into and be complementary to the remaining portion of the scene on the celluloid sheet and the two scenes will join without apparent break in the continuity of the scene.

The cut-out celluloid sheet is then preferably placed between two plain glass plates 8, 9, as shown in Figure 4, forming an assembled unit 7, to make the picture present a flat appearance, and prevent buckling or shifting of the celluloid plate and hold it tightly in place.

The actual physical set employed is shown in Figure 5, which occupies the portion of the field of view represented by the cut-away portion of the celluloid plate.

This actual set will usually comprise an entrance 11 through which the actors 12 pass into the foreground of the field of view, and in any case the actual set will be so chosen as to be suitable for ready entrance of the actors, and of reasonable cost.

It is possible to have this set show any type of changing visual actions which are complementary to the remaining portion of the background shown in Figure 4 whether such visual actions show actors or other actions.

In order to prevent undesired types of definition or images of the background, the outline of the principal object in the background may be frosted on one plain glass plate, as shown at 13 for the outline of the house in Figure 6. The same effect can be produced by applying to the outline of the principal object on the glass a suitable liquid to produce an artificial frosting. Such frosting will diffuse the light passing through the celluloid plate and plain glass plates and avoid having part of the scene underexposed and another part overexposed. This will aid in having the scene of the celluloid plate blend with the actual visual actions and will give a resultant picture which can not be distinguished from a photograph taken with actors in a complete actual physical corresponding set. The plate so frosted will be the one of Figure 4 which is nearest to the illuminating light, usually the plate 9 remote from the camera.

The composite scene taken by the camera is shown in Figure 7, at 14, comprising the portion of the background remaining after part of the photograph is cut out as shown in Figure 4, and the visual actions occurring in the physical set of Figure 5.

Figure 8 shows the assembly 15 of the plurality of transparent plates 17, 18, 19, carrying representations or photographs of different objects occupying the portion of the field of view to be occupied by the retained portion of the photographic background, as shown in Figure 4. The scenes represented on the different plates 17, 18, 19, are superposed, and they may represent any desired physical scenes at separate points. For instance, one plate may represent trees or other landscape objects. The photographs on the plates may be colored if color photography is to be employed. This group of plates is also preferably mounted between supporting flat transparent glass plates, 16, 20 as in Figure 4. Referring to Fig. 9, the retained portion 7 of the plate photograph of the background as shown in Figure 4 is placed in front of the motion picture camera so that it is within the focus at infinity (exit pupil) of the lens system of the camera 25, and so that the retained portion of the photographic plate background scene is complementary to the actual physical set of Figure 5. The photographic scene of Figure 4 may be on a relatively small plate and mounted comparatively close to the camera lens. However, it is often convenient to use the celluloid plate unit 7 in a size as large as 3 x 5 feet, and positioned approximately six feet from the camera, the distance depending on the angle and other characteristics of the camera lens. For use with any usual type of motion picture lens, the distance of six feet is suitable. It is difficult to make photographic prints on plates larger than 10 x 12 inches, and to get larger celluloid plate units, it is preferable to make a mosaic of a number of different partial plates. The celluloid plate unit 7 is mounted in a supporting frame 23, 24 on a base 22. The camera 25 is actuated and controlled from a control box 26. The celluloid film unit 7 is illuminated by light sources 27, 28, 29, 30, positioned as required, front, back, sides, top, bottom. With an ordinary translucent celluloid plate, the back lights 28, 29, 30, will usually be sufficient. If a photographic print on ordinary opaque paper is used, illumination from the front as from source 27 will be best. The intensity of the light sources is adjustable to blend with the illumination of the actual set 10.

Figure 10 shows the assembly of the camera 25 with the door-way 11 and actor 12 in connection with a multiple celluloid plate unit 31, comprising individual celluloid plates 32, 33, 34, 35, which are so mounted that their respective scenes are viewed as superposed by the camera. As shown in Figure 10, these separate celluloid plates, each carrying different aspects of the background, may be mounted in spaced relation which gives an adjustable perspective effect. It is ordinarily more simple to use the arrangement of Figure 8, with the several celluloid plates closely superposed.

The object shown on the celluloid plate 3 mounted between plates 8 and 9, may be a mobile object, such as a dirigible airship or a battleship, and the plate 3 may be slidably mounted between frames 23, 24, so that it can be slowly translated across the field of view, to give the effect of motion of the mobile object. Such translating movement across the field of view may be effected with a single celluloid plate carrying the mobile object, or with the plurality of celluloid plates as shown in Figure 10, mounted substantially parallel to each other. My invention is applicable to various important situations. For instance, if it is desired to photograph a scene including a large electric sign on Broadway, the sign is photographed on the celluloid plate, which avoids the expense of actually constructing such a sign, or elaborate famous architectural structures can be similarly photographed on the celluloid plate.

By using photographic positives on plates in the manner described, I have therefore provided a simple and inexpensive method of accurately recording a background scene in a part of the field of view of the finished picture. My method has many advantages over an alternative method of having an artist paint a background scene on glass, through which the camera takes the action, since the expense of having such a painting made by an artist will be of the order of $2,000, and it will necessarily not be a faithful reproduction of the actual original scene in all details, while my photographic system reproduces faithfully in every detail.

While I have described my invention particularly with reference to photographic representations of the scenes of the portion of the field of view to be superposed on the visual actions, I also intend that my invention may employ other forms of representation for this purpose, such as paintings, black-and-white drawings, cartoons, silhouettes, etchings, and the like, and the employment of such other forms of representations is comprised within the spirit of my invention.

Having thus described the invention, what is claimed is:

1. In an apparatus for motion picture photography, a camera comprising a principal lens system, a physical set occupying a portion of the field of view, a photographically recorded translucent positive print of a partial scene occupying a portion of the field of view complementary to said portion thereof occupied by said physical set, said print being recorded on a transparent medium and the portion of said medium not occupied by said print being clearly transparent, and transparent laminar means for carrying said print and rigidly flatly supporting said print, said means being frosted over the portion thereof in register with the portion of said print occupied by said partial scene, for diffusing the light incident thereon, said print being small in size relative to said set and being mounted relatively close to said lens system in such manner that the partial scene on said print occupies a portion of the field of view of said camera complementary to and continuous with the scene of said physical set.

2. In an apparatus for motion picture photography, a camera comprising a principal lens system, a physical set occupying a portion of the field of view, a plurality of closely superposed transparent plates respectively carrying different translucent pictorial representations of partial scenes each occupying a portion of the field of view complementary to said portion thereof occupied by said set, the portions of said plates not occupied by said representations of said partial scenes being clearly transparent, and transparent laminar means for carrying said plates closely superposed and rigidly flatly supporting said plates, said means being frosted over the portion thereof in register with the respective portions of said plates occupied by said representations of said partial scenes for diffusing the light incident thereon, said plates being mounted closely superposed relatively near said lens system with the representations of said partial scenes on said plates in mutual registry and in such manner that said representations on said plates of said partial scenes occupy a portion of the field of view of said camera complementary to and continuous with the scene of said physical set.

3. In an apparatus for motion picture photography, a camera comprising a principal lens system, a physical set occupying a portion of the field of view, a photographically recorded translucent positive print of a partial scene occupying a portion of the field of view complementary to said portion thereof occupied by said physical set, said print being recorded on a transparent medium and the portion of said medium not occupied by said print being clearly transparent, a light source positioned on the side of said positive print remote from said camera for illuminating said positive print, a flat transparent plate mounted on the side of said print remote from said camera for flatly supporting said print, said plate being frosted over the portion thereof in register with the portion of said print occupied by said partial scene for diffusing the light incident thereon, said print being small in size relative to said set and being mounted relatively close to said lens system in such manner that the partial scene on said print occupies a portion of the field of view of said camera complementary to and continuous with the scene of said physical set.

4. In an apparatus for motion picture photography, a camera comprising a principal lens system, a physical set occupying a portion of the field of view, a photographically recorded positive print of a partial scene occupying a portion of the field of view separate from and complementary to said portion thereof occupied by said physical set, the areas of said print representing material objects being light-transmitting of an order of magnitude intermediate complete transparency and complete opaqueness, said print being small in size relative to said set and being mounted relatively close to said lens system in such manner that the partial scene on said print occupies a portion of the field of view of said camera complementary to and continuous with the scene of said physical set, and a source of light mounted on the side of said light-transmitting print opposite said camera for projecting light upon and through said light-transmitting print from the back side thereof with reference to said camera.

5. In an apparatus for motion picture photography, a camera comprising a principal lens system, a physical set occupying a portion of the field of view, a plurality of closely superposed transparent plates respectively carrying positive photographic prints of scenes each occupying a portion of the field of view separate from and complementary to said portion thereof occupied by said set, the areas of said prints representing material objects being light-transmitting of an order of magnitude intermediate complete transparency and complete opaqueness, the portions of said plates not occupied by said prints of said partial scenes being clearly transparent, said plates being mounted closely superposed relatively near said lens system with the prints of said partial scenes on said plates in mutual registry and in such manner that said representations on said plates of said partial scenes occupy a portion of the field of view of said camera complementary to and continuous with the scene of said physical set, and a source of light mounted on the side of one of said plates opposite said camera for projecting light upon and through said light-transmitting print on said plate from the back side thereof with reference to said camera.

6. In the making of motion pictures of visual actions and a background scene employing a camera and a physical set occupying a discrete portion of the field of view of said camera, the method of making composite motion pictures which consists in photographically making as an overall light-transmitting transparency a positive print of a background scene occupying the entire field of view, cutting out a discrete portion of said print corresponding to the portion of the field of view occupied by said set, mounting said cut print before said camera in separate complementary and continuous relation with said set with reference to the field of view of said camera, illuminating said light-transmitting print from the side thereof opposite said camera, and photographing by said camera in superposed relation the background scene of said print and the visual actions of said set.

7. In an apparatus for motion picture photography, a camera comprising a principal lens system, a physical set occupying a portion of the field of view, a photographically recorded transluscent positive print of a partial scene occupying a portion of the field of view complementary to said portion thereof occupied by said physical set, said print being recorded on a transparent medium and the portion of said medium not occupied by said print being clearly transparent, transparent laminar means for carrying said print and rigidly flatly supporting said print, said means being frosted over the portion thereof in register with the portion of said print occupied by said partial scene for diffusing the light incident thereon, said print being small in size relative to said set and being mounted relatively close to said lens system in such manner that the partial scene on said print occupies a portion of the field of view of said camera complementary to and continuous with the scene of said physical set, and means for mounting said print in the field of view of said camera translatably thereacross relatively close to said lens system in such manner that the partial scene on said print occupies a portion of the field of view of said camera complementary to the scene of said physical set, said means comprising frames between which said print is slidably mounted.

8. In an apparatus for motion picture photography, a camera comprising a principal lens system, a physical set occupying a portion of the field of view, a photographically translucent recorded positive print of a partial scene occupying a portion of the field of view complementary to said portion thereof occupied by said physical set, said print being recorded on a transparent medium and the portion of said medium not occupied by said print being clearly transparent, and transparent laminar means for carrying said print and rigidly flatly supporting said print, said means being provided with a light-diffusing area over the portion thereof in register with the portion of said print occupied by said partial scene for diffusing the light incident thereon, said print being small in size relative to said set and being mounted relatively close to said lens system in such manner that the partial scene on said print occupies a portion of the field of view of said camera complementary to and continuous with the scene of said physical set.

9. In an apparatus for motion picture photography, a camera comprising a principal lens system, a physical set occupying a portion of the field of view, a plurality of closely superposed transparent plates respectively carrying different transluscent pictorial representations of partial scenes each occupying a portion of the field of view complementary to said portion thereof occupied by said set, the portions of said plates not occupied by said representations of said partial scenes being clearly transparent, and transparent laminar means for carrying said plates closely superposed and rigidly flatly supporting said plates, said means being provided with a light-diffusing area over the portion thereof in register with the respective portions of said plates occupied by said representations of said partial scenes for diffusing the light incident thereon, said plates being mounted closely superposed relatively near said lens system with the representations of said partial scenes on said plates in mutual registry and in such manner that said representations on said plates of said partial scenes occupy a portion of the field of view of said camera complementary to and continuous with the scene of said physical set.

10. In an apparatus for motion picture photography, a camera comprising a principal lens system, a physical set occupying a portion of the field of view, a photographically recorded translucent positive print of a partial scene occupying a portion of the field of view complementary to said portion thereof occupied by said physical set, said print being recorded on a transparent medium and the portion of said medium not occupied by said print being clearly transparent, a light source positioned on the side of said positive print remote from said camera for illuminating said positive print, a flat transparent plate mounted on the side of said print remote from said camera for flatly supporting said print, said plate being provided with a light-diffusing area over the portion thereof in register with the portion of said print occupied by said partial scene for diffusing the light incident thereon, said print being small in size relative to said set and being mounted relatively close to said lens system in such manner that the partial scene on said print occupies a portion of the field of view of said camera complementary to and continuous with the scene of said physical set.

VINCENT I. WHITMAN.